United States Patent [19]

Innes et al.

[11] Patent Number: 4,756,056
[45] Date of Patent: Jul. 12, 1988

[54] POULTRY TRANSFER APPARATUS

[76] Inventors: Robert S. Innes, 92 Queensdale Avenue East, Hamilton, Ontario, Canada, L9A 1K3; Bernard McGuire, 211 Cochrane Road, Hamilton, Ontario, Canada, L8K 3G5

[21] Appl. No.: 60,655
[22] Filed: Jun. 11, 1987
[51] Int. Cl.⁴ .............................................. A22C 21/00
[52] U.S. Cl. .......................................... 17/11; 17/24; 198/436; 198/601
[58] Field of Search ........................... 17/11, 44.1, 24; 198/605, 436, 440, 601

[56] References Cited

U.S. PATENT DOCUMENTS

| | | | |
|---|---|---|---|
| 3,572,493 | 3/1971 | Babunovic | 198/440 |
| 3,643,293 | 2/1972 | Rejsa et al. | 17/44.1 X |
| 3,766,602 | 10/1973 | Bottomley et al. | 17/24 X |
| 4,660,256 | 4/1987 | Innes et al. | 17/24 X |

Primary Examiner—Willie G. Abercrombie
Attorney, Agent, or Firm—McConnell and Fox

[57] ABSTRACT

In a poultry processing conveyor system a plurality of evisceration lines are fed from a single kill line by means of a rotary hock cutter transfer carousel.

16 Claims, 6 Drawing Sheets

POULTRY TRANSFER APPARATUS

FIELD OF THIS INVENTION

This invention relates to poultry processing equipment and more particularly to a method and apparatus for transferring poultry from shackles on one conveyor line to shackles on another line without loss of orientation.

DESCRIPTION OF THE PRIOR ART

In the commercial processing of poultry, conveyors are employed to carry the poultry through the process equipment and from one operation to the next. In general, one line is used as a killing and plucking line and one or more separate lines are used as eviscerating lines. The eviscerating lines are isolated from the kill line and a transfer mechanism is required to transfer the poultry from the kill line to the eviscerating lines. Our prior Canadian Patent No. 1,203,654 issued Apr. 29, 1986 describes a carousel transfer mechanism for transferring poultry from a kill line to one eviscerating line and simultaneously cutting the hocks.

At any time when it is required to slow down or stop the eviscerating line, for example, to further inspect the carcasses, it is evident that the poultry must either be discharged from the kill line or the kill line must be stopped. Difficulties arise if one stops the kill line since the fowl may be immersed in scalding water, which properly is part of the process, or exposed to rubber plucking fingers and both these activities must be stopped before they damage the fowl. It would be preferable to permit the kill line to continue in operation even when the eviscerating line is stopped.

In U.S. Pat. No. 3,643,293 issued Feb. 22, 1972 to Jack J. Rejas et al, one possible solution to these problems is proposed. This comprises an auxiliary conveyor line of rectangular form which picks up the poultry from the kill line at the hock cutter, transfers them across the space and onto the evisceration line. The eviscerating line, which is running at a slower speed than the plucking line, is able to receive the total output from the plucking line by placing two birds at each pick-up point. Thus the number of birds handled per minute by the evisceration line is the same as the number of birds handled per minute by the plucking line. In addition, means is provided for temporary storage of birds when the evisceration line is slowed down or stopped. These provisions, however, are complex and the whole apparatus is large and unwieldy and takes up substantial space requiring, as it does, re-orientation of half the shackles of the birds arriving from the kill line in order to place them in back to back pairs on the evisceration line and also, means for providing storage for the unused birds when the evisceration line is slowed down. The result is a large, unwieldy and expensive transfer mechanism.

SUMMARY OF THE INVENTION

In accordance with the present invention, a carousel type of transfer mechanism is provided between the kill line and the evisceration lines. This carousel mechanism not only provides the hock cutter operation, as described in our prior patent, but is arranged to feed the evisceration lines so that the total through-put of birds from the kill line can be picked up from the carousel on evisceration lines that are travelling at less speed than the kill line. Because the pick-up points of the evisceration lines and the shackle points of the carousel mechanism must be synchronized, the evisceration lines and the carousel are positively synchronized by means of positive acting clutches which may be disengaged to permit continual operation of the carousel even when one of the or both of the evisceration lines are stopped and yet ensure proper synchronization of the evisceration lines and the carousel when the process is restarted.

Means are also provided to ensure that the proper series of birds are discharged from the carousel onto the proper evisceration line to ensure equal distribution of the birds from the kill line to all of the evisceration lines, which may be two or more.

BRIEF DESCRIPTION OF THE DRAWINGS

A clearer understanding of our invention may be had from the consideration of the drawings in which.

Figure 1A:
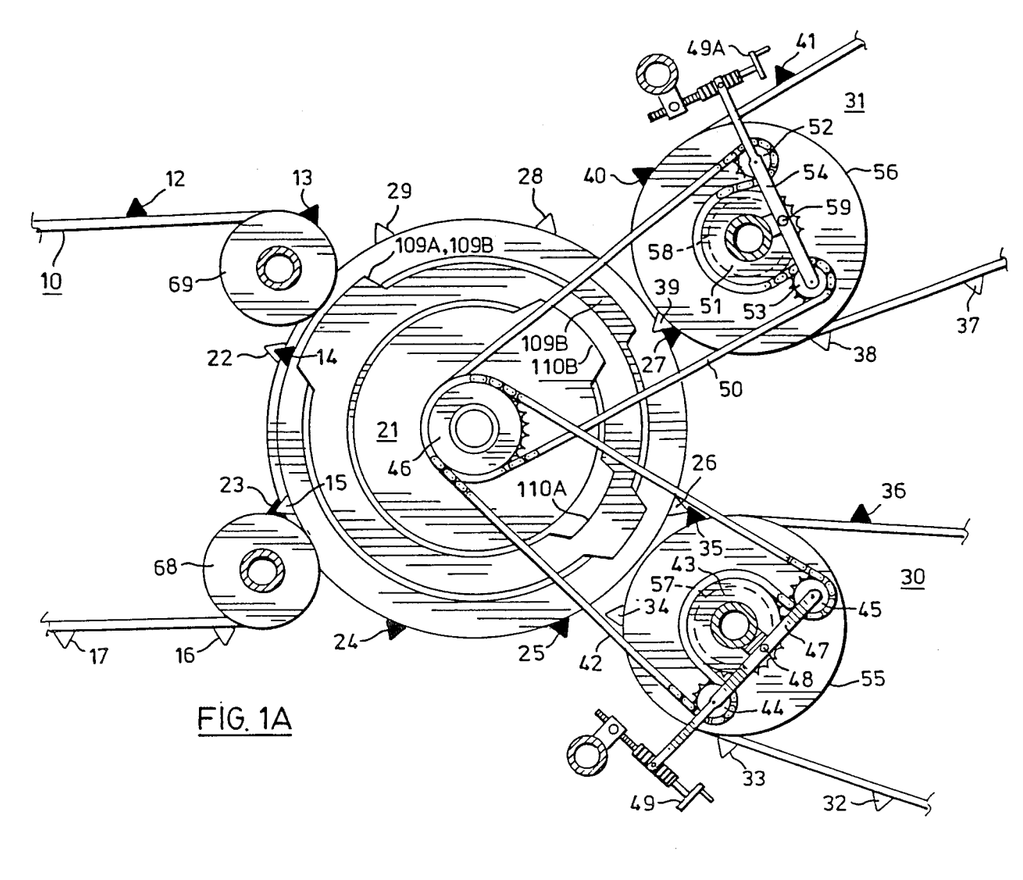
FIG. 1A is a schematic diagram showing a portion of the poultry conveyor system.

Considering first FIG. 1, there is shown a schematic representation of a portion of a poultry processing conveyor system including a kill line designated 10 having a plurality of shackles, shown as triangles, designated 12–17. The convention has been adopted that a triangle represents a shackle or other carcass-holding device, and a shaded triangle indicates a loaded shackle, that is one containing the carcass of a fowl. It should be understood that this is only a schematic diagram and no attempt has been made to adhere to actual mechanical form or dimension. The kill line is engaged by the transfer carousel 21, which, in a manner described in our previous patent, removes the feet from the carcass by means of a hock cutter and transfers the carcass to the carousel which has a plurality of modules or shackles 22, 23, 24, etc. to 29.

After passing through the hock cutter, the carcasses are carried by the carousel to the evisceration lines 30 and 31. Evisceration line 30 also has a plurality of shackles designated 32–36 inclusive, and evisceration line 31 has a plurality of shackles 37–41 inclusive. The evisceration lines are synchronized with the carousel by chain drives from the carousel. Evisceration line 30, for example, is coupled by means of chain 42 which passes around sprocket 43 and around idler sprockets 44 and 45 and around the main drive sprocket 46 which is connected directly to the carousel shaft. The idler sprockets 44 and 45 are mounted on each end of a lever 47 which is pivoted about the pivot point 48 and rotationally adjustable about the pivot by means of a hand wheel 49 in a manner later described. In a similar manner, evisceration line 31 is driven by chain 50 which passes around sprocket 51, around idler sprockets 52 and 53 which are mounted on lever 54 pivoted at 59 and then around a sprocket 46A corresponding to sprocket 46 on the carousel. Sprockets 43 and 51 respectively are coupled to the drive wheels 55 and 56 by means of pneumatic clutches 57 and 58 which intercouple the sprocket 43 and drive wheel 55 and sprocket 51 and drive wheel 56 respectively.

Figure 1B:
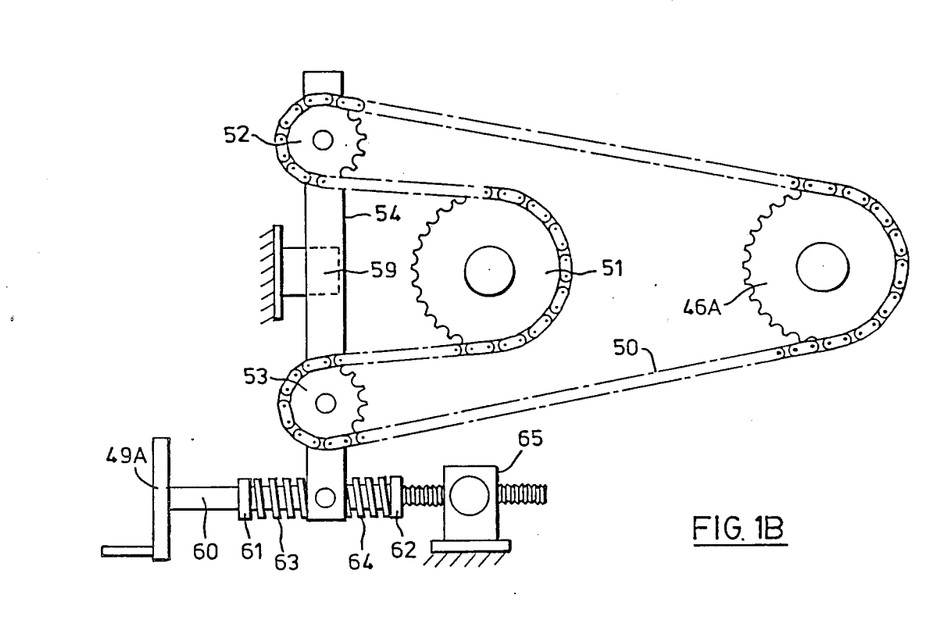
FIG. 1B is a detail plan view of a portion of the mechanism of the system of FIG. 1A.

The phasing adjustment for the evisceration line 31 is shown in greater detail in FIG. 1B. Here, in the partially schematic diagram, the drive sprocket 51 on evisceration line 31 is shown coupled to its chain 50 which passes around sprocket 46A on the carousel. The two idler sprockets 52 and 53 are mounted on lever 54 which pivots about pivot point 59 which is mounted on the frame of the machine. One end of lever 54 is slidably mounted by a pivoting block on a shaft 60 and longitudinally positioned on the shaft between a pair of stops 61 and 62 and a pair of springs 63 and 64. The threaded shaft 60 is threadably engaged in a mount 65 attached to the frame of the machine. A handwheel 49A on the end of shaft 60 permits rotation of the shaft 60 in the threaded mount 65 causing the end of lever 54 to be moved to right or left. The effect of this rotation will be to change the phase relationship of sprocket 51 and sprocke 46A and thus the phase relationship of the carousel with respect to the evisceration line as handwheel 49A is rotated.

Figure 2A:
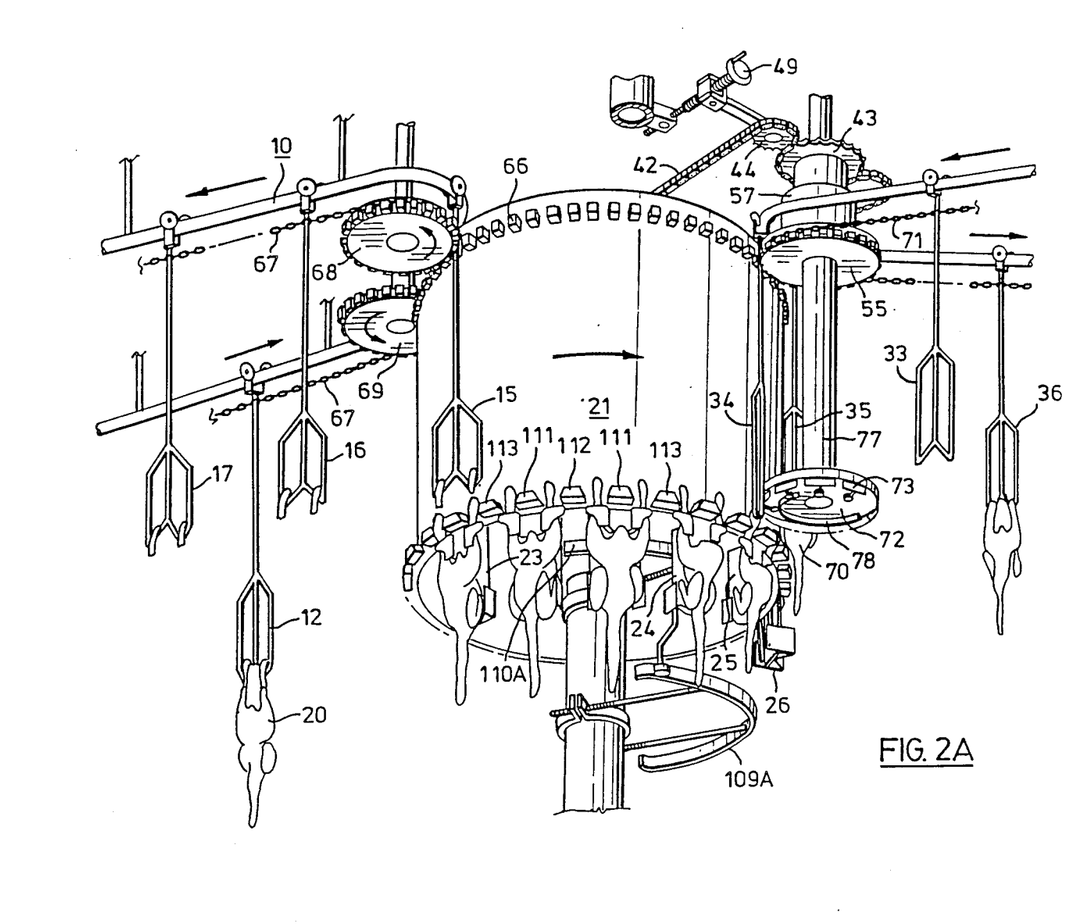
FIG. 2A is a side perspective view of the transfer apparatus, intercoupling the kill line with an evisceration line.

Some of the mechanical details of the conveyor and transfer mechanism can be seen in FIG. 2A which shows the kill line 10 with a carcass 20 suspended from shackle 12 which is just approaching the transfer and hock cutter carousel 21. It will be understood that FIG. 2A does not illustrate a whole mechanism, some of the shackles and modules having been omitted to avoid confusion. The carousel illustrated also shows more modules than those included in the schematic diagram of FIG. 1, does not include the empty modules on the far side and various other repetitious detail which it is believed would not add to the explanation of the system. As described in our previous patent, the shackles are carried around the conveyor by chain 67 which passes around wheels 68 and 69 and engages the teeth 66 on the carousel. In this way, the motion of the shackles on the kill line 10 are synchronized with the motion of the modules on the carousel. As the conveyor proceeds, the carcass 20 on shackle 12 will be picked up by module 28 on the carousel and then proceed around the carousel held by the transfer module. Shackle 15 has already discharged the carcass it was carrying to module 23 and is now empty except for the feet. Similarly, shackles 16 and 17 are empty having discharged their carcasses into modules 24 and 25 respectively. Module 26 on the carousel is partially obscured but it has already discharged its carcass 70 into shackle 35 on evisceration line 30. Shackle 34 of evisceration line 30 is approaching the carousel and will be arranged to receive the carcass from module 24. As in the case of the kill line, the evisceration line 30 includes a chain 71 which pulls the shackles around the conveyor, this chain passes around wheel 55 which as previously described is coupled to sprocket 43 by means of a positive acting clutch 57.

As will be seen, as shackle 34 approaches the carousel, if it remains tangential to wheel 72, the front edge of shackle 34 would tend to strike the carcass on module 25. This carcass is going to pass evisceration line 30 and proceed to evisceration line 31. In order to avoid interference between the shackles on evisceration line 30 and the carcasses on the modules which are being passed to evisceration line 31, the shackles are tilted as they approach the carousel in a manner more clearly shown in FIG. 2B.

Figure 2B:
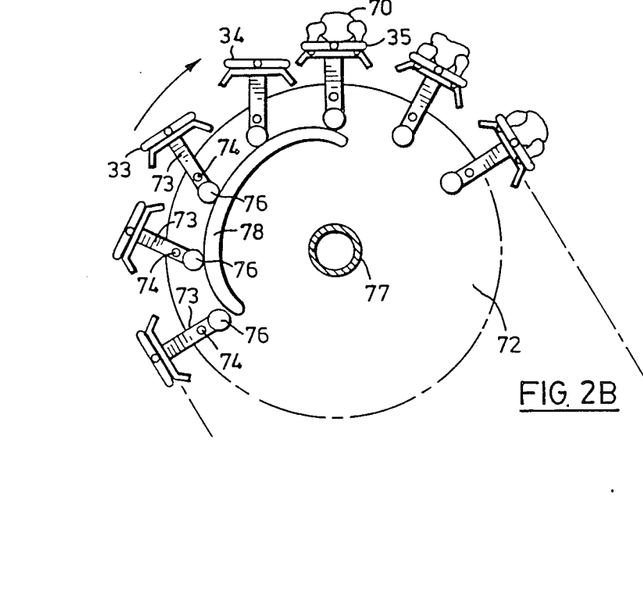
FIG. 2B is a detail plan view of a portion of the mechanism of FIG. 2A.
Figure 2C:
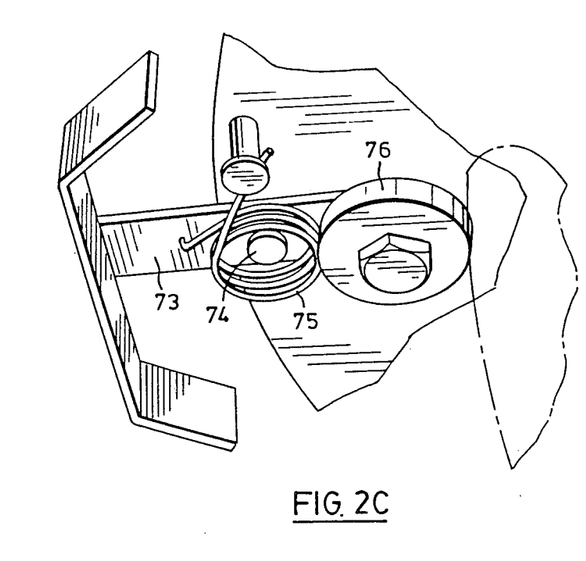
FIG. 2C is a perspective view of a detail of the mechanism of FIG. 2B.

As will be seen in FIG. 2B, the shackles, as they pass around wheel 55, normally lie against the surface of wheel 72. Wheel 72 includes a plurality of T-shaped levers 73 pivoted about pivot 74. The outer leg of each lever is normally parallel to the periphery of wheel 72 and maintained in this position by spring 75 mounted on a pin attached to wheel 72. The inner leg of each lever includes a roller 76. Wheel 72 is coupled to wheel 55 by shaft 77. As wheel 72 rotates, the rollers on levers 73 encounter surface 78, which is mounted fixedly on the frame of the machine in a manner not shown. As the rollers encounter surface 78 they rotate the levers 73 about pivots 74. As will be seen, any shackle in the position of shackle 34, which is resting against the outer leg of the lever, will be rotated into a position non-tangential with the circumference of wheel 72 thus reducing the chance of interference between the shackle and any carcass on the carousel. At the pick-up point, the roller of 76 of lever 73 is released from surface 78 and the lever 73 rotates once more into its unactivated position with its outer leg tangential to the circumference of wheel 72. The shackle then resumes its normal tangential position ready to receive a carcass from the carousel.

Figure 3A:
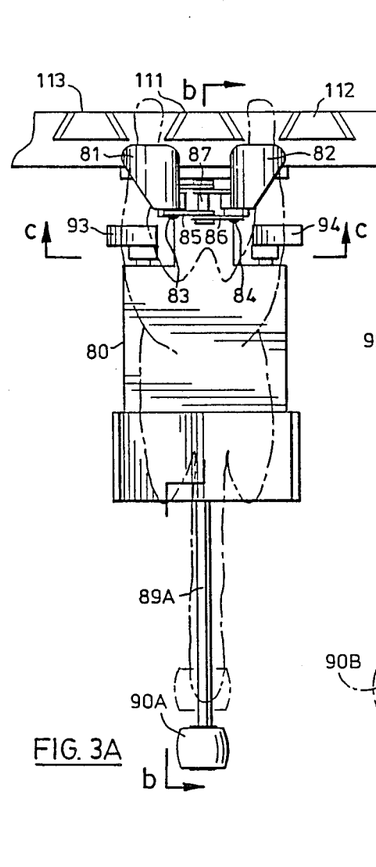
FIGS. 3A to 3C are a series of illustration of portions of the carcass-holding modules of the transfer carousel.
Figure 3B:
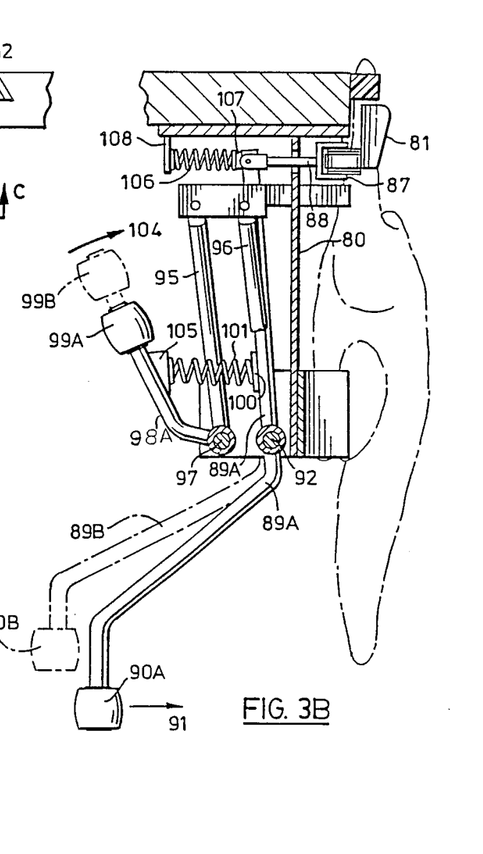
Figure 3C:
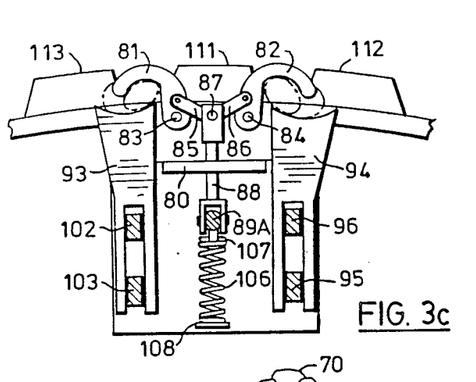

Some details of the mechanical operation of the transfer module, typical of module 24 for example, are shown in FIGS. 3A, 3B and 3C. FIG. 3A is a front elevation of a module, FIG. 3B is side elevation in section of a module at section b—b on FIG. 3A. FIG. 3C is a vertical section of a module at section c—c on FIG. 3A. A module includes a backing plate 80 on which are mounted a pair of latches 81 and 82. The latches are more or less L-shaped but their particular contour may be better appreciated from a careful examination of FIGS. 3A, 3B and 3C. The latches are pivoted at pivot points 83 and 84 and interconnected by levers 85 and 86 which are joined at their inner ends at pivot point 87 where they are connected to push rod 88. Push rod 88 is connected to lever 89A as shown in FIG. 3C. A spring 106 is interposed between a pad 107 on push rod 88 and abutment 108 normally urging push rod 88 to the right as viewed in FIG. 3B. Lever 89A is pivoted on shaft 92. At the lower end of lever 89A is a cam follower roller 90A. When the cam follower roller 90A is pushed in the direction of arrow 91 in FIG. 3B by cam 109A, push rod 88 is moved to the left causing the levers 85 and 86 to collapse pulling the latches 81 and 82 towards each other. The other mechanism in the transfer module is a pair of pushers 93 and 94, with bifurcated ends which are arranged to engage the drumsticks of the carcass when the carcass is held in the transfer module. Guides 113, 111, 112 on the carousel serve to locate the legs of the carcass aligned with the latches and pushers. The pushers are mounted on a pair of parallel acting support levers such as levers 95 and 96 as shown in FIG. 3B which are pivoted at their lower ends on shafts 97 and 92 and on pusher 94 at their upper ends. Also mounted on shaft 97 is lever 98A which terminates in the roller cam follower 99A. Attached to the lever 98A is a pad 105. A cross-member 100 interconnects levers 96 and 102. A spring 101 is interposed between cross-member 100 and pad 105. A similar pair of levers correspond to levers 95 and 96 and support pusher 93, these are designated 102 and 103 as shown in FIG. 3C and lever 102 is connected to cross-member 100 in a manner similar to lever 96. When roller 99A is pushed in the direction of arrow 104 in FIG. 3B by cam 110A, the pushers are moved forward engaging the drumsticks of the carcass and pushing it to the right as seen in FIGS. 3B and 3C. The cams engaged by cam followers 90A and 99A respectively are cams 109A and 110A shown schematically in FIG. 1.

OPERATION

Figure 4:
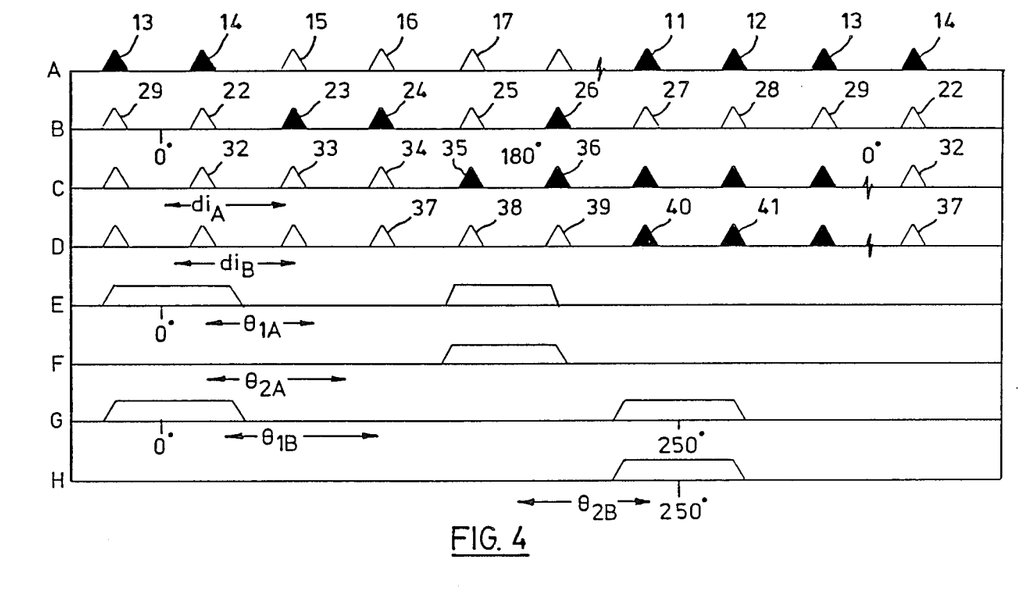
FIG. 4 is a series of graphs illustrating the phase and synchronization relationship of the conveyor lines, the carousel and the various cams operating the carousel modules.

FIGS. 1 and 4 are of particular assistance in understanding the operation of the system. "A" at FIG. 4 illustrates the position of the shackles on the kill line at a given instant in accordance with the schematic diagram of FIG. 1. The break in the line indicates the loop (which is not shown) where the fowl are placed on the kill line and processed. "B" illustrates the instantaneous position of the modules on the carousel. It will be noted that the number of modules on the carousel must equal an even number times the number of evisceration lines to be fed from the carousel. In the system illustrated there are eight positions on the carousel. While the illustration of the position of the shackles on the kill line is with reference to distance from a fixed point, the illustration of the position of the carousel is in degrees as shown below, assuming a reference position of zero degrees between modules 22 and 29, being the first and last modules on the carousel.

FIG. 4C illustrates the position of the shackles on evisceration line 30. Once again, the break in the line indicates that the shackles proceed through the process where the birds are further processed and then removed from the shackles and the shackles return empty to the carousel contact point.

FIG. 4D represents the position of the shackles on evisceration line 31.

It will be noted that by movement of the idler sprockets 44 and 45 by means of handwheel adjustment 49, the phase relationship of evisceration line 30 with reference to the carousel may be adjusted as indicated by the bi-directional arrows $di_A$ and, in a similar manner, location of the shackles on evisceration line 31 may be phase adjusted with reference to the shackles on the carousel by adjustment of the idler sprockets 52 and 53 which varies $di_B$, as illustrated in FIG. 4D.

FIG. 4E represents the physical location of cam 109A. It will be noted that there are two rises on the cam, one around the zero degree mark and one around the 180° mark in the particular arrangement illustrated. The actual relative location of the rises will, of course, depend upon the radial location of the kill line and the evisceration lines with respect to each other. It will be noted that the physical position of cam 109 can be adjusted as indicated by the double arrow $\theta_{1A}$ which indicates that the cam may be rotated clockwise or counterclockwise with reference to the position of the carousel thus determining the point of operation of the cam.

FIG. 4F represents the physical position of cam 110A and it will be noted it has a single rise in the vicinity of the 180° mark and may also be physically rotated as indicated by the double arrow $\theta_{2A}$ which indicates the phase relationship between the physical position of the cam and the rotating position of the carousel and indicates that the cam may be adjusted to determine the point of operation of the cam.

Cams 109A and 110A are associated with evisceration line 30. A further pair of cams 109B and 110B correspond to cams 109A and 110A and are associated with evisceration line 31. The physical position of these cams and their activation of the transfer shackles is illustrated at 4G and 4H. It will be noted that these cams can also be adjusted in a rotational position with reference to the carousel independent of cams 109A and 110A and these adjustments designated $\theta_{1B}$ and $\theta_{2B}$ are illustrated on the diagram at 4G and 4H. It will also be noted that the rise on the cam illustrated at 4G is at the zero degree mark and at the 250° mark.

In operation, it is assumed that the killed and plucked fowl carcasses are carried on the kill line 10 in the shackles 11, 12, 13 and 14 for example, and the carcass on shackle 14 engages carousel module 22. It will be noted at this point that cam 109A is engaging follower 90A causing the latches 81 and 82 to be moved towards each other thus permitting the upper ends of the drumsticks of the carcass to drop into the slots in the carousel. The hock cutter then proceeds to sever the feet from the drumsticks in a manner described in our preceding patent. As the carousel rotates, follower 90A disengages because the rise on the cam terminates, follower 90A returns to its original position and latches 81 and 82 move across the ends of the drumsticks trapping them in the slots in the carousel and holding the carcass firmly in place. The carcasses are carried around the carousel until they reach the evisceration line. When carousel module 25 approaches evisceration line 30, cam follower 90A once more engages the cam, because of the rise at the 180° mark, this, once more, open the latches 81 and 82 releasing the carcass from the carousel shackle. At the same time, pushers 93 and 94 are operated by cam follower 99A which engages the rise on cam 110A, thus pushing the carcass away from the carousel shackle and into the empty evisceration line shackle.

As previously indicated, there are two sets of modules on the carousel. One set of modules, designated the "A" set, and represented by modules 22, 24, 26 and 28 is constructed exactly as shown in FIGS. 3A and 3D. The second set, designated the "B" set, represented by modules 23, 25, 27 and 29 is identical to the "A" set except the cam followers corresponding to followers 90A and 99A are at a different location (shown dotted in FIG. 3) and their corresponding cams are located in a different axial position, but otherwise correspond substantially to cams 109A and 110A. The cam which we designate 109B activates the cam follower 90B which is the cam follower on the "B" set of carousel modules which corresponds to cam follower 90A in the "A" set of carousel modules.

FIG. 4G illustrates the rise positions on cam 109B and it will be noted that there is a rise around the zero degree mark and a similar rise around the 150° mark FIG. 4H represents the cam 110B.

As has been indicated, the originally described cams 109A and 110A activate the "A" series of carousel modules while the cams 109B and 110B activate the "B" series of carousel modules. It will be evident therefore that module 25 will be operated as it passes evisceration line 31 thus causing transfer of the carcass from module 25, or module 27 as the case may be, to evisceration line 31.

As illustrated in FIG. 1, the carcass on module 27 is about to be transferred to empty shackle 39 on evisceration line 31. It will be noted that when the transfer from the carousel to the evisceration lines occurs the carcass is released from the carousel and drops into the empty shackle on the evisceration line. Because the carcass is momentarily freed from restraint, it is necessary that these two shackles be accurately located with reference to one another when the release occurs. It will also be evident that the carcass will have a velocity dependent on the speed of the carousel and its trajectory, when released, will therefore depend upon the speed of operation of the system. It is for this reason that the idler sprockets 44 and 45, 52 and 53 may be pivoted to adjust the phase relationship of the shackles on the evisceration line with respect to modules on the carousel. It will also be noted that pneumatic clutches 57 and 58 are positive acting clutches and can only relate the sprockets 43 and 51 to their respective drive wheels 55 and 56 in a single rotational position thus ensuring that if one or more of the evisceration lines are disconnected from the carousel drive by operating the clutch, when the clutch is once more engaged it re-engages in the same rotational location as it disengaged, thus ensuring the phase relationship of the carousel shackle and the evisceration line shackles is maintained.

Also, in order to ensure a proper transfer, cams 109A, 110A, 109B and 110B are adjustable in their rotary position independent of each other and the operator can suitably adjust them to obtain satisfactory transfer of the carcass from the carousel to the evisceration line. It has been found that since the pushers 93 and 94 are resiliently connected to pad 105, the apparatus may be simplified by using a single cam 110 which operates the cam followers on both the "A" and "B" modules over the whole angular distance (i.e. from the rise on cam 110A to the fall on cam 110B). The pushers are thus activated but the carcass is not ejected until the latches are released by cam 109A or 109B as the case may be.

It will be understood that while the system has been described for transferring fowl from a kill line to two evisceration lines, more than two evisceration lines could be fed from the single carousel. It is only necessary, as previously indicated, that the number of carousel modules correspond to an even number times the number of evisceration lines to be fed and that each set of carousle modules have its own separate set of operating cams

We claim:

1. A transfer mechanism for transferring poultry carcasses from a first conveyor line to a plurality of secondary conveyor lines comprising a rotary carousel including a plurality of carcass-retaining modules, said conveyor lines including shackles for carrying said poultry carcasses by their leg portions, individual means in each of said modules for sequentially clamping said carcasses in said modules and releasing them from said first conveyor line shackles, means for individually releasing and ejecting said carcasses from certain of said modules and receiving them in the shackles of one of said secondary conveyor lines, means for individually releasing and ejecting said carcasses from certain other of said modules and receiving them in the shackles of another of said secondary conveyor lines.

2. A transfer mechanism as claimed in claim 1 wherein said first conveyor line is a kill line carrying killed and plucked carcasses by their feet and said modules clamp said carcasses by the end of their drumsticks before the feet are severed from the carcass to release the shackle on the kill line from the carcass.

3. A transfer mechanism as claimed in claim 1 wherein said means for clamping said carcasses in said modules includes a pair of latches which engage the end of the drumsticks of said carcass operated by a first cam.

4. A transfer mechanism as claimed in claim 1 wherein said means for ejecting said carcasses includes a pair of pushers which bear against the drumsticks of said carcasses and are resiliently urged into an ejecting position by a second cam.

5. A transfer mechanism as claimed in claim 1 wherein the relative position of said modules and the said shackles of said secondary conveyor lines at the instant of release of a carcass from a module is adjustable.

6. A transfer mechanism as claimed in claim 1 wherein said means for releasing and ejecting said carcass operates at an adjustable angular rotational position of said carousel.

7. A poultry processing conveyor system including a kill line conveyor having a plurality of shackles for transporting poultry carcasses by their feet, a rotary transfer hock cutter carousel having a plurality of modules for receiving and retaining carcasses from said kill line and releasably retaining them by latches engaging the end of the drumsticks of said carcasses, a plurality of evisceration line conveyors having a plurality of shackles for receiving and retaining carcasses from said transfer modules, means for releasing and ejecting certain of said carcasses from said modules adjacent one of said evisceration lines whereby said carcasses so ejected are received and retained by the shackles of said one evisceration line.

8. A poultry processing conveyor system as claimed in claim 7 including means for releasing and ejecting certain other of said carcasses from said modules adjacent another of said evisceration lines whereby said carcasses so ejected are received and retained by the shackles of said latter evisceration line.

9. A poultry processing conveyor system as claimed in claim 8 wherein said latches are operated by cams which are adjustable to determine the rotational position of said carousel which said modules retain and release said carcasses.

10. A poultry processing conveyor system as claimed in claim 8 or 9 wherein said means for ejecting said carcasses include cam activated pushers which bear against the drumsticks of said carcasses.

11. A poultry processing conveyor system as claimed in claim 7 wherein said rotary carousel is synchronized with said kill line conveyor by a common chain drive.

12. A poultry processing conveyor system as claimed in claim 7 or 11 wherein said rotary carousel and said evisceration line conveyors are releasably synchronized by a positive acting clutch.

13. A poultry processing conveyor system as claimed in claim 12 wherein the phase relationship of said rotary carousel and said evisceration line conveyors is individually and continuously adjustable.

14. A poultry processing conveyor system as claimed in claim 13 wherein said latches are operated by cams which are adjustable to determine the rotational position of said carousel at which said modules retain and release said carcasses.

15. A poultry processing conveyor system as claimed in claim 9 in which said means for ejecting said carcasses are operated by cams which are adjustable to determine the rotational position of said carousel at which said carcasses are ejected from said modules.

16. A poultry processing conveyor system as claimed in claim 13 in which said means for ejecting said carcasses are operated by cams which are adjustable to determine the rotational position of said carousel at which said carcasses are ejected from said modules.

* * * * *